US008710273B2

(12) United States Patent
De Cooman et al.

(10) Patent No.: US 8,710,273 B2
(45) Date of Patent: Apr. 29, 2014

(54) METHOD FOR ISOMERISATION OF HOP ALPHA-ACIDS USING HETEROGENEOUS ALKALINE EARTH METAL BASED CATALYSTS

(75) Inventors: Luc De Cooman, De Pinte (BE); Dirk De Vos, Holsbeek (BE); Pascal Mertens, Heverlee (BE); Bart Steenackers, Kasterlee (BE)

(73) Assignee: IFAST NV (BE)

( * ) Notice: Subject to any disclaimer, the term of this patent is extended or adjusted under 35 U.S.C. 154(b) by 0 days.

(21) Appl. No.: 13/643,305

(22) PCT Filed: Apr. 28, 2011

(86) PCT No.: PCT/EP2011/056757
§ 371 (c)(1),
(2), (4) Date: Nov. 16, 2012

(87) PCT Pub. No.: WO2011/135032
PCT Pub. Date: Nov. 3, 2011

(65) Prior Publication Data
US 2013/0060066 A1 Mar. 7, 2013

(30) Foreign Application Priority Data

Apr. 28, 2010 (GB) .................................. 1007067.0
Sep. 15, 2010 (GB) .................................. 1015346.8

(51) Int. Cl.
*C07C 45/67* (2006.01)
(52) U.S. Cl.
USPC ......................................................... 568/341
(58) Field of Classification Search
USPC ......................................................... 568/341
See application file for complete search history.

(56) References Cited

U.S. PATENT DOCUMENTS

| | | | |
|---|---|---|---|
| 3,433,642 A | 3/1969 | Nakayama et al. |
| 3,765,903 A | 10/1973 | Clarke et al. |
| 3,952,061 A | 4/1976 | Koller et al. |
| 4,002,683 A | 1/1977 | Todd, Jr. |
| 4,123,561 A | 10/1978 | Grant |
| 4,154,865 A | 5/1979 | Grant |
| 4,338,348 A | 7/1982 | Muller |
| 4,758,445 A | 7/1988 | Klusters |
| 5,015,491 A | 5/1991 | Westwood et al. |
| 5,155,276 A | 10/1992 | Paul |
| 5,370,897 A | 12/1994 | Smith et al. |

FOREIGN PATENT DOCUMENTS

| | | |
|---|---|---|
| DE | 25 33 589 A1 | 2/1980 |
| EP | 0 311 330 A1 | 4/1989 |
| EP | 0311330 A1 | 4/1989 |
| GB | 1158697 A | 7/1969 |
| WO | 01/36581 A1 | 5/2001 |

OTHER PUBLICATIONS

International Search Report, dated Sep. 5, 2011, issued in priority International Application No. PCT/EP2011/056757.
International Preliminary Report on Patentability, dated Apr. 12, 2012, issued in priority International Application No. PCT/EP2011/056757.

*Primary Examiner* — Sikarl Witherspoon
(74) *Attorney, Agent, or Firm* — Gianna Julian-Arnold; Saul Ewing LLP

(57) ABSTRACT

The invention relates to a process for the production of iso-alpha-acids starting from hop alpha-acids in which an hop alpha-acid containing feed is contacted with a heterogeneous alkaline earth metal based catalyst, that essentially does not dissolve in the alpha-acid containing feed or in the iso-alpha-acid product phase, either in solvent-free conditions or in the presence of water, carbon dioxide, or an organic solvent or a mixture thereof. The resulting mixture is subjected to a temperature of at least 293 K, preferably under an inert atmosphere, for a time sufficient to effect high conversion of the alpha-acid reactant into the iso-alpha-acid product. The molar ratio of alpha-acid to earth alkaline metal (Mg, Ca, Sr, Ba) varies preferably between 0.2 and 20. After the isomerization process, the heterogeneous alkaline earth metal based catalyst can be quantitatively separated from the iso-alpha-acid product phase by liquid-solid separation techniques.

11 Claims, No Drawings

METHOD FOR ISOMERISATION OF HOP ALPHA-ACIDS USING HETEROGENEOUS ALKALINE EARTH METAL BASED CATALYSTS

CROSS REFERENCE TO RELATED APPLICATIONS

This application claims the priority of PCT/EP2011/056757, filed on Apr. 28, 2011, which claims priority to Great Britain Application Nos. 100706730, filed Apr. 28, 2010 and 1015346.8, filed Sep. 15, 2010, the entire contents of each of which are hereby incorporated in total by reference.

FIELD OF THE INVENTION

The present invention relates to an improved process for the production of (hop) iso-alpha-acids (isohumulones) by the isomerisation of (hop) alpha-acids (humulones), using heterogeneous alkaline earth metal based catalysts.

BACKGROUND OF THE INVENTION

Traditionally, hops (powdered hops or hop pellets) are added during the wort boiling stage of the brewing process. This results in the extraction of alpha-acids (humulones) into the sweet wort, which under the influence of temperature are partially isomerized to the derived iso-alpha-acids (isohumulones). These iso-alpha-acids are responsible for the characteristic bitter beer taste. Disadvantages of this approach to impart bitterness by means of powdered or pelletized hops are the inefficient alpha-acid extraction and isomerisation at the wort pH, i.e. a pH between 5 and 6, resulting typically in iso-alpha-acid yields below 40% (GB 1,158,697).

It became clear that the hop utilization can be improved by performing the alpha-acid isomerisation outside the brewing process and more specifically under the effect of basic compounds. One patent uses powdered hops which are mixed with alkaline earth metal oxides and subsequently heated under anaerobic conditions (U.S. Pat. No. 4,123,561). Disadvantages of this process are off-flavour formation and low hop utilization. Therefore, the later developments used hop extracts, obtained by extraction of hop resins (among others the alpha-acids) from the hop cones, rather than powdered hops.

The use of hop extracts instead of the traditional hop products has multiple advantages, among which a more stable and more consistent chemical composition. Generally, such hop extracts are nowadays obtained via liquid or supercritical carbon dioxide extraction, which eliminates the problems of the presence of pesticide and solvent residues in the extracts experienced before when applying organic extraction solvents like hexane. Carbon dioxide hop extracts provide predominantly alpha-acids (humulones) next to beta-acids (lupulones), and they are further fractionated to obtain alpha-acid enriched hop extracts.

Starting from these alpha-acid containing extracts, the "off-line" isomerisation or pre-isomerisation of alpha-acids outside the brewing process can be achieved using alkali metal and/or alkaline earth metal based compounds via two approaches. The first approach applies a solvent-free reaction medium while in the other approach the transformation is performed after addition of solvents, either pure water or alternatively water mixed with an organic solvent.

The first approach is generally based on alkaline earth metal compounds, for example alkaline earth metal oxides (e.g. MgO). These inorganic accelerators are mixed with the alpha-acid containing extract. However, during these isomerisation processes, the oxides are at least partially dissolved and therefore, after a long reaction time at elevated temperature, the iso-alpha-acid products are obtained as alkaline earth metal cation-isohumulate complexes (U.S. Pat. No. 5,015,491) with an isomer distribution of cis- and trans-iso-alpha-acids of 50:50. To obtain the iso-alpha-acids as a pure organic phase, an additional step is required which involves acidification (with e.g. an aqueous solution of sulfuric acid) of the alkaline earth metal isohumulate salts. This leads to an iso-alpha-acid layer which can be decanted from the separate aqueous layer containing the alkaline earth metal sulfate salts. To obtain the commercial product, a neutralisation process with a potassium compound is required which results in an aqueous solution of dissolved potassium isohumulates. This process type implies that the initially added alkaline earth metal compounds cannot be recovered as such from the products because of their reaction with the alpha-acid feed.

In the other approach, alkali metal salts and/or alkaline earth metal salts are used, e.g. $K_2CO_3$ and $MgCl_2$ solutions (U.S. Pat. No. 3,765,903; U.S. Pat. No. 3,952,061; U.S. Pat. No. 4,002,683; U.S. Pat. No. 4,758,445). Stoichiometric molar quantities of alkali metal or alkaline earth metal cations and high temperatures are generally required to fully convert the alpha-acids into iso-alpha-acids in the water containing reaction medium. This isomerisation reaction also results in the formation of alkali metal and/or alkaline earth metal isohumulate salts. Again, to isolate the pure iso-alpha-acids, an acidification and a decantation step are required. In addition, the presence of water leads to the formation of unwanted degradation by-products, e.g. humulinic acids.

In U.S. Pat. No. 5,370,897, an alkaline earth metal salt (e.g. $MgSO_4$) and an alkali metal salt ($K_2CO_3$) were combined into one process to speed up the alpha-acid isomerisation.

U.S. Pat. No. 5,155,276 describes the application of a heterogeneous accelerator viz. $Al_2O_3$, additionally requiring a dissolved alkali metal compound in at least stoichiometric molar ratio to the alpha-acid reactant. Although in this process an 'insoluble catalyst' is used which can be separated from the reaction mixture by filtration after the isomerisation reaction, the heterogeneous catalyst is by itself not sufficiently effective, and needs a second, dissolved accelerator. Moreover, additional acidification and decantation steps are still required to obtain the pure iso-alpha-acid product.

The above clearly shows that the isomerisation processes of hop alpha-acids known in the art are complex reactions, comprising the use of dissolvable reaction accelerating compounds and including acidification and decantation to remove the inorganic accelerators, thus resulting in high levels of waste products, with often the unwanted formation of degradation by-products. Also, the initially added alkali metal and alkaline earth metal compounds cannot be recovered as such from the product phase due to the formation of isohumulates and salts thereof following reaction of the alkali metal and alkaline earth metal compounds with the alpha-acids. Thus, there remains a need for improved methods for the isomerisation of hop alpha-acids.

SUMMARY OF THE INVENTION

The present invention relates to an improved method for the production of an isomerized hop preparation from a hop alpha-acid containing feed, preferably from a hop extract, said hop extract preferably being obtained by extraction with liquid or supercritical carbon dioxide. The present invention also relates to an iso-alpha-acid composition obtainable by said method.

A first object of the present invention provides a method for the isomerisation of hop alpha-acids comprising contacting a hop alpha-acid containing feed with an alkaline earth metal based compound, acting as a heterogeneous catalyst, which essentially does not dissolve in the alpha-acid containing feed and thus essentially no dissolved alkaline earth metal cations coming from the dispersed heterogeneous catalyst are present in the isomerisation reaction mixture. Preferably, said alkaline earth metal based insoluble compound can be quantitatively recovered from the isomerized hop preparation after the isomerisation reaction by means of liquid-solid separation techniques. Particularly, less than 0.1% of said alkaline earth metal based insoluble compound is dissolved in the isomerized hop preparation after the isomerisation reaction (or the product phase). Alternatively, less than 0.1% of alkaline earth metal (iso)humulate salts are formed during isomerisation and are dissolved in the product phase.

In a preferred embodiment of the present invention said heterogeneous alkaline earth metal based insoluble catalysts are inorganic materials, containing magnesium, calcium, strontium or barium or mixtures thereof. Preferably, said alkaline earth metal based insoluble heterogeneous catalyst is an alkaline earth metal based mixed oxide or hydroxyapatite. More preferably, said alkaline earth metal based insoluble heterogeneous catalyst is of the aluminate type, titanate type, silicate type and/or hydroxyapatite type and comprises magnesium, calcium, strontium or barium or mixtures thereof. Preferably, said alkaline earth metal based heterogeneous catalyst is in its anhydrous form or as a hydrated analogue. Preferably, said alkaline earth metal based catalyst has a high surface area, at least 10 m$^2$/g.

In another preferred embodiment of the method of the present invention the molar ratio of the alpha-acid to the alkaline earth metal is between 0.1 and 40, preferably between 1 and 20, more preferably between 5 and 10.

In yet another preferred embodiment of the method according to the present invention, the isomerisation reaction occurs in the absence (or solvent-free conditions) or in the presence of water, carbon dioxide, or an organic solvent or a mixture thereof. Preferably, the isomerisation reaction occurs at a temperature of at least 293 K, more preferably between 323 and 373 K.

Preferably, the isomerisation reaction occurs under an inert atmosphere and is allowed to proceed for a time sufficient to achieve more than 95% conversion of the alpha-acids with more than 95% selectivity to iso-alpha-acids. Preferably, the method according to the present invention further comprises the step of separating the heterogeneous catalyst from the obtained iso-alpha-acid product after the reaction, for instance by centrifugation, filtration, decantation or by other liquid-solid separation techniques.

Another object of the present invention provides a hop iso-alpha-acid composition comprising at least 75 wt % iso-alpha-acids on hop (iso)-alpha-acids basis, wherein the molar ratio of cis-iso-alpha-acids to trans-iso-alpha-acids is at least 60:40, and wherein said iso-alpha-acid composition is essentially free of dissolved alkaline earth metal salts of hop alpha-acids, hop iso-alpha-acids, humulinic acids and/or other alkaline or hydrolytic degradation products of hop (iso)-alpha-acids. Preferably, the molar ratio of cis-iso-alpha-acids to trans-iso-alpha-acids is in the range of 70:30 to 90:10.

DETAILED DESCRIPTION

Description

The present invention provides an improved process for the isomerisation of hop alpha-acids using heterogeneous alkaline earth metal based catalysts. Thus, the present invention relates to a method for the isomerisation of hop alpha-acids comprising mixing an alpha-acid containing feed, preferably a hop extract, and a heterogeneous alkaline earth metal based catalyst, either in the absence or in the presence of a suitable solvent.

Within the context of the present invention, a heterogeneous catalyst is in the meaning that no significant or no substantial dissolution of the catalyst in the product phase can be measured by elemental analysis and the catalyst can be quantitatively recovered after the isomerisation reaction from the product phase by means of liquid-solid separation techniques known in the art. More in particular, "no significant or no substantial dissolution of the catalyst" is in the meaning that the product phase is essentially free of dissolved alkaline earth metal isohumulate salts. Preferably, less than 0.1%, more preferably less than 0.01% of the alkaline earth metals present in the dispersed catalyst can be found as dissolved species in the product phase after separation of the heterogeneous catalyst from the product phase. This furthermore implies that no or only traces of dissolved alkaline earth metal isohumulate salts are formed during the isomerisation reaction according to the method of the present invention, thus removing the need for an acidification step to remove the inorganic accelerators. This is clearly in contrast with respect to the prior art and illustrates an advantage of the method of the present invention. Thus, the present invention provides an improved process for the isomerisation of hop alpha-acids using heterogeneous alkaline earth metal based catalysts without an additional acidification step to remove the inorganic compounds and/or to isolate the iso-alpha-acids.

Indeed, the prior art discloses that alkaline earth metal compounds, in particular alkaline earth metal oxides and hydroxides, are mixed with the alpha-acid containing extract and subsequently react during the isomerisation process with the alpha-acids and at least partially dissolve, resulting in the formation of (dissolved) alkaline earth metal cation-isohumulate complexes (e.g. U.S. Pat. No. 5,015,491, EP0311330). This thus implies that the initially added alkaline earth metal compounds cannot be recovered as such from the iso-alpha-acid products and an acidification and a decantation step are required to isolate the iso-alpha-acids and to remove the inorganic compounds.

In the context of the present invention, the heterogeneous alkaline earth metal based catalysts are inorganic material, containing magnesium, calcium, strontium or barium or mixtures thereof. In order to obtain a sufficient catalytic activity, the catalyst usually contains at least 5 weight percent of alkaline earth metals per dry weight. The alkaline earth metal based catalysts may be used in their anhydrous form or in their hydrated form. The alkaline earth metal based catalysts may be crystalline or amorphous. An amorphous catalyst is in the meaning that they do not produce any significant diffraction lines in an X-ray diffraction measurement. The alkaline earth metal based catalysts have a surface area between 1 and 1000 m$^2$/g, preferably between 10 and 500 m$^2$/g, more preferably between 25 and 250 m$^2$/g, as measured by nitrogen physisorption analysis, performed after drying the catalysts under nitrogen flow for 6 h at 423 K.

Preferred heterogeneous alkaline earth metal based catalysts are alkaline earth metal based mixed oxides of the aluminate, titanate or silicate type, and alkaline earth metal based catalysts of the hydroxyapatite type, such as for instance, magnesium aluminate, calcium aluminate, strontium aluminate, barium aluminate, magnesium titanate, calcium titanate, strontium titanate, barium titanate, magnesium silicate, calcium silicate, strontium silicate, barium silicate, magnesium hydroxyapatite, calcium hydroxyapatite, strontium hydroxyapatite and barium hydroxyapatite. Also alkaline earth metal based catalysts of the aluminate, titanate, silicate and hydroxyapatite type, containing more than one type of alkaline earth metal are included. Preferred combinations are Mg—Ca, Mg—Sr, Mg—Ba, Ca—Sr, Ca—Ba, Sr—Ba, Mg—Ca—Sr, Mg—Ca—Ba, Mg—Sr—Ba, Ca—Sr—Ba and Mg—Ca—Sr—Ba. This list is not limitative and all heterogeneous alkaline earth metal based catalysts fulfilling the requirements set forth above can be used within the present invention. Particularly, the ratio of the highest occurring alkaline earth metal to the lowest occurring alkaline earth metal in said alkaline earth metal based catalysts containing more than one type of alkaline earth metal is between 10000:1 mol/mol and 1:1 mol/mol. Particularly preferred heterogeneous alkaline earth metal based catalysts include high-surface-area alkaline earth metal aluminates, containing magnesium, calcium, strontium, barium or mixtures thereof.

In another preferred embodiment of the present invention, the catalysts are used with molar ratios of the alpha-acid to the alkaline earth metal between 0.1 and 40, more preferably between 1 and 20, and most preferably between 5 and 10.

In a preferred embodiment of the present invention, said method further comprises the step of subjecting said mixture of a heterogeneous alkaline earth metal based catalyst and an alpha-acid containing feed, preferably a hop extract, to a temperature of at least 323 K, preferably while stirring. More preferably, the isomerisation reaction is allowed to proceed for a time sufficient to achieve more than 95% conversion of the alpha-acids with more than 95 selectivity to iso-alpha-acids.

In the context of the present invention, the alpha-acid containing feed is preferably a hop extract, more preferably a hop extract obtained by liquid or supercritical carbon dioxide extraction.

In yet another preferred embodiment of the present invention, the isomerisation reaction of hop alpha-acids catalyzed by the heterogeneous alkaline earth metal based materials occurs at temperatures of at least 293 K. Preferably, the reaction mixture is kept at a reaction temperature in the range of 293 K to 383 K, and more preferably between 323 K and 373 K, most preferably between 343 K and 363 K. The reaction mixture is maintained at the preferred temperature for a reaction time which is in the range of 0.1 to 48 hours, more preferably in the range of 0.5 to 24 hrs. During the reaction, an inert atmosphere is maintained above the reaction mixture. Suitable inert atmospheres can be created by using gases like nitrogen, helium, argon or carbon dioxide or by applying a vacuum.

The heterogeneous alkaline earth metal based catalysts can be used in solvent-free conditions. Alternatively, instead of working in solvent-free conditions, also water, carbon dioxide and organic solvents, such as alcohol or glycol solvents (for example methanol, ethanol, 1-propanol, 2-propanol or mixtures of those alcohol solvents) or solvent mixtures thereof (such as mixtures of water and alcohol and/or glycol solvents) can be used as reaction media. Furthermore, the heterogeneous alkaline earth metal based catalyst can be quantitatively separated from the reaction medium by means of simple centrifugation, filtration, decantation, or by other liquid-solid separation techniques thus allowing recycling of the heterogeneous alkaline earth metal based catalyst.

The isomerisation reaction is carried out without addition of other inorganic compounds, like soluble alkali metal or alkaline earth metal compounds, such as those used in the isomerisation reactions known in the art. Specifically, there is no need to use additional sodium hydroxide, potassium hydroxide, magnesium hydroxide, calcium hydroxide, magnesium oxide, calcium oxide, sodium carbonate, potassium carbonate, magnesium carbonate, calcium carbonate, sodium bicarbonate, potassium bicarbonate, magnesium bicarbonate, calcium bicarbonate, magnesium sulfate or calcium sulfate. Again, it is understood that this list is not limitative.

The isomerisation process can thus be conducted in a stirred batch reactor whereby powder or pelletized catalyst and an alpha-acid containing feed are loaded into the reaction vessel at the start of the process. In addition, since no significant or no substantial dissolution of the catalyst in the product phase occurs, in another embodiment, the isomerisation catalyst is used as a fixed bed in a tubular reactor and the alpha-acid containing feed is pumped through the process reactor which allows direct collection of the iso-alpha-acid products at the reactor outlet. It is also possible to use other reactor designs that are generally known to people skilled in heterogeneous catalysis. A non-limiting list of such reactor set-ups can be found in J.-F. Lepage et al. (Applied Heterogeneous Catalysis, Institut Français du Pétrole, Editions Technip, 1987).

After obtaining high conversion of the alpha-acid reactant in solvent-free conditions, such as at least 75%, 80%, 85%, 90% or 95%, the iso-alpha-acid product can be isolated as an organic phase by any unit operation that is suitable for liquid-solid separation. Preferred techniques are centrifugation or filtration of the heterogeneous alkaline earth metal based catalyst, or decantation of the liquid layer. Alternatively, when the isomerisation is performed in the presence of water, carbon dioxide or organic solvents or mixtures thereof, the liquid-solid separation allows to obtain the iso-alpha-acid products dissolved in the solvent or solvent mixture. It is a particular advantage of the present invention that no additional work-up steps are required, such as acidification, decantation or extraction processes to obtain the iso-alpha-acids as a product phase.

Another specific advantage of this invention is that the obtained iso-alpha-acids are essentially free from by-products, such as humulinic acid, originating from side reactions like alkaline or hydrolytic degradation. Preferably, the obtained iso-alpha-acid composition comprises less than 5% or 2%, more preferably less than 1% or 0.5% of said by-products.

As a result of the catalytic procedure of the invention, an iso-alpha-acid composition is obtained that is rich in cis-iso-alpha-acids, which are more chemically stable than trans-iso-alpha-acids. Specifically, the invention allows to obtain iso-alpha-acids with a cis:trans ratio that is equal to or larger than 60:40. Thus, the present invention also relates to a method for the production of an iso-alpha-acid composition, with a cis:trans ratio of at least 60:40, preferably with a cis:trans ratio in the range of 70:30 to 90:10, more preferably with a cis:trans ratio in the range of 72:28 to 80:20 or in the range of 74:26 to 80:20, comprising the steps of (i) mixing an alpha-acid containing feed, preferably a hop extract, and a heterogeneous alkaline earth metal based catalyst, either in the absence or in the presence of a suitable solvent, and (ii) subjecting said reaction mixture to a temperature of at least 293 K.

Another object of the present invention provides an iso-alpha-acid composition, comprising at least 75 wt %, 80 wt %, 85 wt %, 90 wt % or 95 wt % iso-alpha-acids on hop (iso)-alpha-acids basis, wherein the molar ratio of cis-iso-alpha-acids to trans-iso-alpha-acids is at least 60:40, preferably in the range of 70:30 to 90:10, in particular in the range of 72:28 to 80:20 or 74:26 to 80:20. Preferably, said iso-alpha-acid composition is essentially free of dissolved alkaline earth metal salts of hop alpha-acids and/or hop iso-alphaacids. Particularly, no significant or no substantial dissolution of the heterogeneous alkaline earth metal based catalyst in said iso-alpha-acid composition can be measured by elemental analysis. Preferably, said iso-alpha-acid composition comprises less than 20 ppm, more preferably less than 10 ppm or 5 ppm or 2 ppm alkaline earth metal elements. Preferably, said iso-alpha-acid composition is essentially free of humulinic acid and other alkaline or hydrolytic degradation products. Particularly, said iso-alpha-acid composition comprises less than 5 wt % or 2 wt %, more preferably less than 1 wt % or 0.5 wt % of humulinic acid or other alkaline or hydrolytic degradation products, formed by degradation of the iso-alpha-acid product.

Said iso-alpha-acid composition may comprise other hop compounds including but not limited to beta-acids or derivatives thereof, hop oils or derivatives thereof, and hop polyphenols.

The details of the invention will be explained below with reference to the Examples:

Example 1

Solvent-Free Isomerisation of Alpha-Acids with Constant Molar Amounts of Magnesium Based Catalysts at 363 K Magnesium aluminate ($MgAl_2O_4$) was prepared by the co-precipitation method. The pH of a 200 mL aqueous mixture of magnesium nitrate hexahydrate (30 mmol) and aluminium nitrate nonahydrate (60 mmol) was adjusted to 9.5 with an aqueous 25% ammonia solution. This mixture was then stirred for 1 h and ripened for 12 h. The obtained precipitate was subsequently washed with deionized water (5×100 mL) and thereupon dried for 12 h at 393 K. Finally, the resulting powder was calcined for 8 h at 1073 K leading to the formation of pure magnesium aluminate. After the drying step and after the calcination step the material was crushed and ground with pestle and mortar.

Magnesium titanate ($MgTiO_3$) was prepared by the sol-gel method. First, a 200 mL aqueous mixture of magnesium nitrate hexahydrate (80 mmol), titanium isopropoxide (80 mmol) and citric acid (400 mmol) was prepared. After heating this mixture to 363 K, ethylene glycol (250 mmol) was added. Instantaneously, a gel phase formed which was dried at 373 K for 48 h. Next, the obtained residue was decomposed by treating it for 2 h at 473 K followed by 2 h at 773 K. Finally, the resulting powder was calcined at 1073 K for 6 h leading to the formation of pure magnesium titanate.

Magnesium silicate ($MgSiO_3$) was obtained from a commercial supplier.

Magnesium hydroxyapatite ($Mg_5(PO_4)_3(OH)$) was prepared by the co-precipitation method. First, the pH of an aqueous 250 mL solution of diammonium hydrogen phosphate (60 mmol) was adjusted to 12 with an aqueous 25% ammonia solution. Second, an aqueous 150 mL solution of magnesium nitrate hexahydrate (100 mmol) was prepared. Next, the first solution was added to the second solution by 5 mL doses, with the full volume of the first solution added within 1 h. Next, the obtained mixture was refluxed for 4 h. The obtained precipitate was washed with deionized water (5×100 mL) and thereupon dried at 353 K for 12 h. Finally, the resulting powder was calcined for 1 h at 973 K leading to the formation of pure magnesium hydroxyapatite.

All solvent-free isomerisation experiments were performed in triplicate for statistical reliability. The starting composition of the alpha-acid reactant was: 94.1% alpha-acids and 5.9% iso-alpha-acids. Varying amounts of the powder catalysts were added to 0.4 g of alpha-acid extract. Next, the reaction mixture was stirred and heated to 363 K for 18 h. All reaction vessels were flushed and pressurized with 0.5 MPa nitrogen gas. The powder catalysts were separated from the reaction mixture by centrifugation.

The sample analyses were performed by means of an HPLC device equipped with a binary pump, vacuum degasser, autosampler, column thermostat, and diode array detector. Two Zorbax Extend C18 columns (150 mm length×4.6 mm inner diameter, packed with 5 μm particles) were used in series. The mobile phase consisted of 5 mM ammonium acetate in 20 (v/v) ethanol adjusted to a pH of 9.95 with ammonia (A solvent) and a mixture consisting of 60% acetonitrile (60%) and 40% ethanol (v/v) (B solvent). The flow rate was set at 0.4 mL/min and solvent gradient elution was performed: 0-12 min: 0-16% B, 12-14 min: 16-25% B, 14-44 min: 25-40% B, 44-54 min: 40-60% B, 54-64 min: 60-90% B, 64-70 min: 90-100% B. The column temperature was maintained at 308 K. 1 μL volumes of filtered samples were injected. The UV detection was performed at 256 nm for the iso-alpha-acid products and 330 nm for the alpha-acid substrates. The samples from the solvent-free isomerisation experiments were analyzed after addition of 1 mL ethanol.

At a reaction temperature of 363 K, 0.4 g of alpha-acids was converted with 0.0157 g of magnesium aluminate (molar reactant:magnesium ratio=10) to iso-alpha-acids with an iso-alpha-acid yield of 19.6% after 18 h, with a product selectivity to iso-alpha-acids of >95.0 (Table 1, entry 1). In the control experiment without addition of a catalyst, an iso-alpha-acid yield of 11.8% was obtained under the same reaction conditions (Table 1, entry 5). Under the same reaction conditions, 0.0132 g of magnesium titanate (molar reactant:magnesium ratio=10) resulted in an iso-alpha-acid yield of 15.2%, with a product selectivity to iso-alpha-acids of >95.0% (Table 1, entry 2). Under the same reaction conditions, 0.0108 g of magnesium silicate (molar reactant:magnesium ratio=10) resulted in an iso-alpha-acid yield of 14.3%, with a product selectivity to iso-alpha-acids of >95.0% (Table 1, entry 3). Under the same reactions conditions, 0.0093 g of magnesium hydroxyapatite (molar reactant:magnesium ratio=10) resulted in an iso-alpha-acid yield of 12.7%, with a product selectivity to iso-alpha-acids of >95.0% (Table 1, entry 4).

TABLE 1

Solvent-free isomerisation of alpha-acids with constant molar amounts of magnesium based catalysts at 363 K

| catalyst | catalyst weight | yield of iso-alpha-acids | selectivity to iso-alpha-acids |
|---|---|---|---|
| entry 1 | $MgAl_2O_4$ | 0.0157 g | 19.6% | >95.0% |
| entry 2 | $MgTiO_3$ | 0.0132 g | 15.2% | >95.0% |
| entry 3 | $MgSiO_3$ | 0.0108 g | 14.3% | >95.0% |
| entry 4 | $Mg_5(PO_4)_3(OH)$ | 0.0093 g | 12.7% | >95.0% |
| entry 5 | / | / | 11.8% | >95.0% |

Reaction conditions: molar reactant:magnesium ratio = 10; 0.4 g reactant; 363 K; 18 h.

This comparison of magnesium based catalysts shows that magnesium aluminate is the most active catalyst (among magnesium aluminate, magnesium titanate, magnesium silicate and magnesium hydroxyapatite) on molar basis for the solvent-free isomerisation of alpha-acids to iso-alpha-acids at 363 K.

Example 2

Solvent-Free Isomerisation of Alpha-Acids with Constant Molar Amounts of Alkaline Earth Metal Aluminates at 363 K Magnesium aluminate ($MgAl_2O_4$), calcium aluminate ($CaAl_2O_4$), strontium aluminate ($SrAl_2O_4$) and barium aluminate ($BaAl_2O_4$) were prepared by the co-precipitation method. The synthesis of magnesium aluminate was performed as described in Example 1. For the preparation of the other alkaline earth metal aluminate materials, the same procedure was used, except for the different alkaline earth metal sources, which were calcium nitrate tetrahydrate, anhydrous strontium nitrate and anhydrous barium nitrate respectively.

The isomerisation experiments and sample analyses were performed as described in Example 1.

At a reaction temperature of 363 K, 0.4 g of alpha-acids was converted with 0.0157 g of magnesium aluminate (molar reactant:magnesium ratio=10) to iso-alpha-acids with an iso-alpha-acid yield of 19.6% after 18 h, with a product selectivity to iso-alpha-acids of >95.0% (Table 2, entry 1). In the control experiment without addition of a catalyst, an iso-alpha-acid yield of 11.8% was obtained under the same reaction conditions (Table 2, entry 5). Using 0.0175 g of calcium aluminate (molar reactant:calcium ratio=10) resulted in an iso-alpha-acid yield of 24.3% (Table 2, entry 2). Using 0.0228 g of strontium aluminate (molar reactant:strontium ratio=10) resulted in an iso-alpha-acid yield of 27.8% (Table 2, entry 3). Using 0.0279 g of barium aluminate (molar reactant:barium ratio=10) resulted in an iso-alpha-acid yield of 51.3% (Table 2, entry 4). For all reactions of this Example, the product selectivity to iso-alpha-acids was >95.0%.

TABLE 2

Solvent-free isomerisation of alpha-acids with constant molar amounts of alkaline earth metal aluminates at 363 K

| | catalyst | catalyst weight | yield of iso-alpha-acids | selectivity to iso-alpha-acids |
|---|---|---|---|---|
| entry 1 | $MgAl_2O_4$ | 0.0157 g | 19.6% | >95.0% |
| entry 2 | $CaAl_2O_4$ | 0.0175 g | 24.3% | >95.0% |
| entry 3 | $SrAl_2O_4$ | 0.0228 g | 27.8% | >95.0% |
| entry 4 | $BaAl_2O_4$ | 0.0279 g | 51.3% | >95.0% |
| entry 5 | / | / | 11.8% | >95.0% |

Reaction conditions: molar reactant:alkaline earth metal ratio = 10; 0.4 g reactant; 363 K; 18 h.

This comparison of alkaline earth metal aluminates shows that barium aluminate is the most active catalyst (among magnesium aluminate, calcium aluminate, strontium aluminate and barium aluminate) on molar basis for the solvent-free isomerisation of alpha-acids at 363 K.

Example 3

Solvent-Free Isomerisation of Alpha-Acids with Constant Molar Amounts of Alkaline Earth Metal Aluminates at 378 K The same alkaline earth metal aluminates as described in Example 2 were used. The same procedure for the isomerisation experiments and sample analyses was applied as described in Examples 1 and 2, except for the reaction temperature of 378 K instead of 363 K and a reaction time of 9 h instead of 18 h.

At a reaction temperature of 378 K, 0.4 g of alpha-acids was converted with 0.0157 g of magnesium aluminate (molar reactant:magnesium ratio=10) to iso-alpha-acids with an iso-alpha-acid yield of 26.5% after 9 h (Table 3, entry 1). In the control experiment without a catalyst, an iso-alpha-acid yield of 14.2% was obtained under the same reaction conditions (Table 3, entry 5). Using 0.0175 g of calcium aluminate (molar reactant:calcium ratio=10) resulted in an iso-alpha-acid yield of 31.7% (Table 3, entry 2). Using 0.0228 g of strontium aluminate (molar reactant:strontium ratio=10) resulted in an iso-alpha-acid yield of 35.4 (Table 3, entry 3). Using 0.0279 g of barium aluminate (molar reactant:barium ratio=10) resulted in an iso-alpha-acid yield of 69.6% (Table 3, entry 4).

TABLE 3

Solvent-free isomerisation of alpha-acids with constant molar amounts of alkaline earth metal aluminates at 378 K

| | catalyst | catalyst weight | yield of iso-alpha-acids |
|---|---|---|---|
| entry 1 | $MgAl_2O_4$ | 0.0157 g | 26.5% |
| entry 2 | $CaAl_2O_4$ | 0.0175 g | 31.7% |
| entry 3 | $SrAl_2O_4$ | 0.0228 g | 35.4% |
| entry 4 | $BaAl_2O_4$ | 0.0279 g | 69.6% |
| entry 5 | / | / | 14.2% |

Reaction conditions: molar reactant:alkaline earth metal ratio = 10; 0.4 g reactant; 378 K; 9 h.

This comparison of alkaline earth metal aluminates shows that barium aluminate is the most active catalyst (among magnesium aluminate, calcium aluminate, strontium aluminate and barium aluminate) on molar basis for the solvent-free isomerisation of alpha-acids at 378 K.

Example 4

Solvent-Free Isomerisation of Alpha-Acids with Alkaline Earth Metal Aluminates of Varying Surface Area at 363 K Regular magnesium aluminate ($MgAl_2O_4$) and barium aluminate ($BaAl_2O_4$) were prepared by the co-precipitation method described in Examples 1 and 2.

High-surface-area magnesium aluminate (HSA-$MgAl_2O_4$) and high-surface-area barium aluminate (HSA-$BaAl_2O_4$) were prepared by a different co-precipitation method. As an example, the synthesis procedure of high-surface-area magnesium aluminate will be described. To a 200 mL aqueous mixture, containing magnesium nitrate hexahydrate (30 mmol) and aluminium nitrate nonahydrate (60 mmol), 3.96 g polyvinyl alcohol (PVA; MW 13,000-23,000; 87-89% hydrolyzed) was added resulting in a molar PVA/Mg ratio of 3. This mixture was stirred and heated to 313 K to dissolve the added PVA completely. Next, the pH of this mixture was adjusted to 9.5 with an aqueous 25% ammonia solution. This mixture was then stirred for 1 h and ripened for 12 h. The obtained precipitate was subsequently washed with deionized water (5×100 mL) and thereupon dried for 12 h at 393 K. Finally, the resulting powder was calcined for 8 h at 973 K leading to the formation of pure magnesium aluminate spinel. After the drying step and after the calcination step the material was crushed and ground with pestle and mortar.

For the preparation of the other high-surface-area barium aluminate material, the same procedure was used, except for the different alkaline earth metal source, namely anhydrous barium nitrate.

The isomerisation experiments and sample analyses were performed as described in Example 1.

TABLE 4

Solvent-free isomerisation of alpha-acids with constant molar amounts of alkaline earth metal aluminates and high-surface-area alkaline earth metal aluminates at 363 K

| catalyst | catalyst weight | yield of iso-alpha-acids | selectivity to iso-alpha-acids |
|---|---|---|---|
| entry 1 | $MgAl_2O_4$ | 0.0157 g | 19.6% | >95.0% |
| entry 2 | $HSA-MgAl_2O_4$ | 0.0157 g | 45.7% | >95.0% |
| entry 3 | $BaAl_2O_4$ | 0.0279 g | 51.3% | >95.0% |
| entry 4 | $HSA-BaAl_2O_4$ | 0.0279 g | 93.7% | >95.0% |
| entry 5 | / | / | 11.8% | >95.0% |

Reaction conditions: molar reactant:alkaline earth metal ratio = 10; 0.4 g reactant; 363 K; 18 h.

At a reaction temperature of 363 K, 0.4 g of alpha-acids was converted with 0.0157 g of regular magnesium aluminate (as prepared in Example 1; molar reactant:magnesium ratio=10) to iso-alpha-acids with an iso-alpha-acid yield of 19.6% after 18 h (Table 4, entry 1). In the following reactions, the same molar reactant:alkaline earth metal ratio of 10 and the same reaction conditions were maintained. Using 0.0157 g of high-surface-area magnesium aluminate, the iso-alpha-acid yield was 45.7% (Table 4, entry 2). With 0.0279 g of regular barium aluminate the iso-alpha-acid yield was 51.3% (Table 4, entry 3); with 0.0279 g of high-surface-area barium aluminate the iso-alpha-acid yield was 93.7% (Table 4, entry 4). For all reactions of this Example, the product selectivity to iso-alpha-acids was >95.0%.

This comparison of alkaline earth metal aluminates shows that high-surface-area barium aluminate is the most active catalyst (among magnesium aluminate, high-surface-area magnesium aluminate, barium aluminate and high-surface-area barium aluminate) on molar basis for the solvent-free isomerisation of alpha-acids to iso-alpha-acids at 363 K.

Example 5

Solvent-Free Isomerisation of Alpha-Acids with Constant Mass Amounts of Alkaline Earth Metal Aluminates at 363 K The same alkaline earth metal aluminates as described in Example 2 were used. Also the same procedure for the isomerisation experiments and sample analyses was applied as described in Example 1.

TABLE 5

Solvent-free isomerisation of alpha-acids with constant mass amounts of alkaline earth metal aluminates at 363 K

| catalyst | catalyst weight | yield of iso-alpha-acids | selectivity to iso-alpha-acids |
|---|---|---|---|
| entry 1 | $MgAl_2O_4$ | 0.03 g | 35.9% | >95.0% |
| entry 2 | $CaAl_2O_4$ | 0.03 g | 40.7% | >95.0% |
| entry 3 | $SrAl_2O_4$ | 0.03 g | 34.5% | >95.0% |
| entry 4 | $BaAl_2O_4$ | 0.03 g | 53.2% | >95.0% |
| entry 5 | / | / | 11.8% | >95.0% |

Reaction conditions: mass reactant:catalyst ratio = 13.3; 0.4 g reactant; 363 K; 18 h.

At a reaction temperature of 363 K, 0.4 g of alpha-acids was converted with 0.03 g of magnesium aluminate (mass reactant:catalyst ratio=13.3) to iso-alpha-acids with an iso-alpha-acid yield of 35.9% after 18 h (Table 5, entry 1). The same reaction conditions and mass ratio between reactant and catalyst were maintained in the following reactions. With 0.03 g of calcium aluminate the iso-alpha-acid yield was 40.7% (Table 5, entry 2). With 0.03 g of strontium aluminate the iso-alpha-acid yield was 34.5% (Table 5, entry 3). With 0.03 g of barium aluminate the iso-alpha-acid yield was 53.2% (Table 5, entry 4). For all reactions of this Example, the product selectivity to iso-alpha-acids was >95.0%.

This comparison of alkaline earth metal aluminates shows that barium aluminate is the most active catalyst (among magnesium aluminate, calcium aluminate, strontium aluminate and barium aluminate) on mass basis for the solvent-free isomerisation of alpha-acids at 363 K.

Example 6

Solvent-Free Isomerisation of Alpha-Acids with Constant Mass Amounts of Alkaline Earth Metal Aluminates of Varying Surface Area at 363 K The same regular alkaline earth metal aluminates and high-surface-area alkaline earth metal aluminates as described in Example 4 were used. The same procedure for the isomerisation experiments and sample analyses was applied as described in Example 1.

TABLE 6

Solvent-free isomerisation of alpha-acids with constant mass amounts of alkaline earth metal aluminates and high-surface-area alkaline earth metal aluminates at 363 K

| catalyst | catalyst weight | yield of iso-alpha-acids | selectivity to iso-alpha-acids |
|---|---|---|---|
| entry 1 | $MgAl_2O_4$ | 0.03 g | 35.9% | >95.0% |
| entry 2 | $HSA-MgAl_2O_4$ | 0.03 g | 74.7% | >95.0% |
| entry 3 | $BaAl_2O_4$ | 0.03 g | 53.2% | >95.0% |
| entry 4 | $HSA-BaAl_2O_4$ | 0.03 g | 95.7% | >95.0% |
| entry 5 | / | / | 11.8% | >95.0% |

Reaction conditions: mass reactant:catalyst ratio = 13.3; 0.4 g reactant; 363 K; 18 h.

At a reaction temperature of 363 K, 0.4 g of alpha-acids was converted with 0.03 g of regular magnesium aluminate (mass reactant:catalyst ratio=13.3) to iso-alpha-acids with an iso-alpha-acid yield of 35.9% after 18 h (Table 6, entry 1). The same catalyst mass and reaction conditions were adopted for the next reactions in this Example. With 0.03 g of high-surface-area magnesium aluminate the iso-alpha-acid yield was 74.7% (Table 6, entry 2). With 0.03 g of regular barium aluminate the iso-alpha-acid yield was 53.2% (Table 6, entry 3). With 0.03 g of high-surface-area barium aluminate the iso-alpha-acid yield was 95.7% (Table 6, entry 4). For all reactions of this Example, the product selectivity to iso-alpha-acids was >95.0%.

This comparison of alkaline earth metal aluminates shows that high-surface-area barium aluminate is the most active catalyst (among magnesium aluminate, high-surface-area magnesium aluminate, barium aluminate and high-surface-area barium aluminate) on mass basis for the solvent-free isomerisation of alpha-acids to iso-alpha-acids at 363 K.

Example 7

Solvent-Free Isomerisation of Alpha-Acids at 363 K: Time Dependency of Iso-Alpha-Acid Yield and Conversion Dependency of cis:trans Ratio The same high-surface-area barium aluminate as described in Example 4 was used. Also the same procedure for the isomerisation experiments and sample analyses (for the determination of the alpha-acid conversion levels) was applied as described in Example 1.

For the determination of the cis:trans ratios of the iso-alpha-acid products, UPLC analyses were applied. The UPLC device comprised a binary pump, vacuum degasser, autosampler, column thermostat, and diode array detector. One Acquity HSS C18 column (150 mm length×2.1 mm inner diameter, packed with 1.8 μm particles) was used. The mobile phase consisted of water acidified to a pH of 2.8 with phosphoric acid (A solvent) and acetonitrile (B solvent). The flow rate was set at 0.5 mL/min and isocratic solvent elution was performed: 48% A and 52% B. The column temperature was maintained at 308 K. 5 μL volumes of filtered samples were injected. The UV detection was performed at 270 nm. The samples from the solvent-free isomerisation experiments were analyzed after 100-fold dilution with 0.5% $H_2SO_4$ in methanol.

At a reaction temperature of 363 K, 0.4 g of alpha-acids was isomerized with 0.0279 g of high-surface-area barium aluminate (molar reactant:barium ratio=10). Iso-alpha-acid yields are given in Table 7, with iso-alpha-acid yields of 24.3% after 2 h, 48.4% after 4 h, 66.5 after 6 h, 78.1% after 8 h, 86.7% after 10 h, 90.8% after 12 h, 92.1% after 14 h, 93.2% after 16 h and 93.7% after 18 h. The product selectivity to iso-alpha-acids was >95.0%, even at high alpha-acid conversion levels. The cis-isomer selectivity amounted to 73-74 (Table 7, entries 1-10).

TABLE 7

Solvent-free isomerisation of alpha-acids with constant molar amounts of high-surface-area alkaline earth metal aluminates at 363 K: time dependency of alpha-acid conversion and conversion dependency of cis:trans ratio

| catalyst | reaction time | yield of iso-alpha-acids | selectivity to iso-alpha-acids | cis:trans ratio of iso-alpha-acids |
|---|---|---|---|---|
| entry 1 | HSA-BaAl$_2$O$_4$ | 0 h | 5.9% | >95.0% | 73:27 |
| entry 2 |  | 2 h | 24.3% | >95.0% | 73:27 |
| entry 3 |  | 4 h | 48.4% | >95.0% | 73:27 |
| entry 4 |  | 6 h | 66.5% | >95.0% | 73:27 |
| entry 5 |  | 8 h | 78.1% | >95.0% | 74:26 |
| entry 6 |  | 10 h | 86.7% | >95.0% | 74:26 |
| entry 7 |  | 12 h | 90.8% | >95.0% | 74:26 |
| entry 8 |  | 14 h | 92.1% | >95.0% | 74:26 |
| entry 9 |  | 16 h | 93.2% | >95.0% | 74:26 |
| entry 10 |  | 18 h | 93.7% | >95.0% | 74:26 |

Reaction conditions: molar reactant:alkaline earth metal ratio = 10; 0.4 g reactant; 363 K.

Example 8

Isomerisation of Alpha-Acids in Ethanol with Constant Molar Amounts of Magnesium Based Catalysts at 348 K The same magnesium based catalysts as described in Example 1 were used.

All isomerisation experiments in ethanol were performed in triplicate for statistical reliability. The starting composition of the alpha-acid reactant was: 94.1% alpha-acids and 5.9% iso-alpha-acids. 0.04 g of alpha-acid extract was added to 1 mL ethanol. After addition of varying amounts of the powder catalysts, the reaction mixture was stirred and heated to 348 K for 18 h. All reaction vessels were flushed and pressurized with 0.5 MPa nitrogen gas. The powder catalysts were separated from the reaction mixture by centrifugation.

For the sample analyses, the same HPLC procedure was applied as described in Example 1, except for the sample preparation. The samples were analyzed as such without addition of a second solvent like water or a further dilution with ethanol.

At a reaction temperature of 348 K, 0.04 g of alpha-acids in 1 mL ethanol was converted with 0.0157 g of magnesium aluminate (molar reactant:magnesium ratio=1) to iso-alpha-acids with an iso-alpha-acid yield of 13.5% after 18 h (Table 8, entry 1). In the control experiment without addition of a catalyst, an iso-alpha-acid yield of 7.8% was obtained under the same reaction conditions (Table 8, entry 5). The same reaction conditions and molar reactant:magnesium ratios were further adopted. Iso-alpha-acid yields and iso-alpha-acid selectivities are described in Table 8. For all reactions of this Example, the product selectivity to iso-alpha-acids was >95.0%.

TABLE 8

Isomerisation of alpha-acids in ethanol with constant molar amounts of magnesium based catalysts at 348 K

| catalyst | catalyst weight | yield of iso-alpha-acids | selectivity to iso-alpha-acids |
|---|---|---|---|
| entry 1 | MgAl$_2$O$_4$ | 0.0157 g | 13.5% | >95.0% |
| entry 2 | MgTiO$_3$ | 0.0132 g | 11.1% | >95.0% |
| entry 3 | MgSiO$_3$ | 0.0108 g | 9.8% | >95.0% |
| entry 4 | Mg$_5$(PO$_4$)$_3$(OH) | 0.0093 g | 8.9% | >95.0% |
| entry 5 | / | / | 7.8% | >95.0% |

Reaction conditions: 1 mL ethanol; molar reactant:magnesium ratio = 1; 0.04 g reactant; 348 K; 18 h.

This comparison of magnesium based catalysts shows that magnesium aluminate is the most active catalyst (among magnesium aluminate, magnesium titanate, magnesium silicate and magnesium hydroxyapatite) on molar basis for the isomerisation in ethanol of alpha-acids to iso-alpha-acids at 348 K.

Example 9

Isomerisation of Alpha-Acids in Ethanol with Constant Molar Amounts of Alkaline Earth Metal Aluminates at 363 K The same alkaline earth metal aluminates as described in Example 2 were used. Also the same procedure for the isomerisation experiments and sample analyses was applied as described in Example 8, except for the reaction temperature of 363 K instead of 348 K.

At a reaction temperature of 363 K, 0.04 g of alpha-acids in 1 mL ethanol was converted with 0.0157 g of magnesium aluminate (molar reactant:magnesium ratio=1) to iso-alpha-acids with an iso-alpha-acid yield of 28.9% after 18 h, with a product selectivity to iso-alpha-acids of >95.0% (Table 9, entry 1). In the control experiment without addition of a catalyst, an iso-alpha-acid yield of 13.4% was obtained under the same reaction conditions (Table 9, entry 5). Results with other catalysts are shown in Table 9. For all reactions of this Example, the product selectivity to iso-alpha-acids was >95.0%.

TABLE 9

Isomerisation of alpha-acids in ethanol with constant molar amounts of alkaline earth metal aluminates at 363 K

| | catalyst | catalyst weight | yield of iso-alpha-acids | selectivity to iso-alpha-acids |
|---|---|---|---|---|
| entry 1 | $MgAl_2O_4$ | 0.0157 g | 28.9% | >95.0% |
| entry 2 | $CaAl_2O_4$ | 0.0175 g | 30.1% | >95.0% |
| entry 3 | $SrAl_2O_4$ | 0.0228 g | 34.5% | >95.0% |
| entry 4 | $BaAl_2O_4$ | 0.0279 g | 37.6% | >95.0% |
| entry 5 | / | / | 13.4% | >95.0% |

Reaction conditions: 1 mL ethanol; molar reactant:alkaline earth metal ratio = 1; 0.04 g reactant; 363 K; 18 h.

This comparison of alkaline earth metal aluminates shows that barium aluminate is the most active catalyst (among magnesium aluminate, calcium aluminate, strontium aluminate and barium aluminate) on molar basis for the isomerisation in ethanol of alpha-acids to iso-alpha-acids at 363 K.

Example 10

Isomerisation of Alpha-Acids in Ethanol with Constant Mass Amounts of Alkaline Earth Metal Aluminates at 363 K The same alkaline earth metal aluminates as described in Example 2 were used. Also the same procedure for the isomerisation experiments and sample analyses was applied as described in Example 8, except for the reaction temperature of 363 K instead of 348 K.

At a reaction temperature of 363 K, 0.04 g of alpha-acids in 1 mL ethanol was converted with 0.04 g of magnesium aluminate (mass reactant:catalyst ratio=1) to iso-alpha-acids with an iso-alpha-acid yield of 70.6% after 18 h, with a product selectivity to iso-alpha-acids of >95.0% (Table 10, entry 1). In the control experiment without addition of a catalyst, an iso-alpha-acid yield of 13.4% was obtained under the same reaction conditions (Table 10, entry 5). Results with other catalysts in the same conditions are described in Table 10.

TABLE 10

Isomerisation of alpha-acids in ethanol with constant mass amounts of alkaline earth metal aluminates at 363 K

| | catalyst | catalyst weight | yield of iso-alpha-acids | selectivity to iso-alpha-acids |
|---|---|---|---|---|
| entry 1 | $MgAl_2O_4$ | 0.04 g | 70.6% | >95.0% |
| entry 2 | $CaAl_2O_4$ | 0.04 g | 65.4% | >95.0% |
| entry 3 | $SrAl_2O_4$ | 0.04 g | 58.5% | >95.0% |
| entry 4 | $BaAl_2O_4$ | 0.04 g | 52.7% | >95.0% |
| entry 5 | / | / | 13.4% | >95.0% |

Reaction conditions: 1 mL ethanol; mass reactant:catalyst ratio = 1; 0.04 g reactant; 363 K; 18 h.

This comparison of alkaline earth metal aluminates shows that magnesium aluminate is the most active catalyst (among magnesium aluminate, calcium aluminate, strontium aluminate and barium aluminate) on mass basis for the isomerisation in ethanol of alpha-acids to iso-alpha-acids at 363 K.

Example 11

Isomerisation of Alpha-Acids in Ethanol with Constant Mass Amounts of Alkaline Earth Metal Aluminates of Varying Surface Area at 363 K The same regular alkaline earth metal aluminates and high-surface-area alkaline earth metal aluminates as described in Example 4 were used. Also the same procedure for the isomerisation experiments and sample analyses was applied as described in Example 8, except for the reaction temperature of 363 K instead of 348 K.

At a reaction temperature of 363 K, 0.04 g of alpha-acids in 1 mL ethanol was converted with 0.04 g of regular magnesium aluminate (mass reactant:magnesium ratio=1) to iso-alpha-acids with an iso-alpha-acid yield of 70.6% after 18 h, with a product selectivity to iso-alpha-acids of >95.0% (Table 11, entry 1). In the control experiment without addition of a catalyst, an iso-alpha-acid yield of 13.4% was obtained under the same reaction conditions (Table 11, entry 5). Results with other catalysts in the same conditions are shown in Table 11. For all reactions of this Example, the product selectivity to iso-alpha-acids was >95.0%.

TABLE 11

Isomerisation of alpha-acids in ethanol with constant mass amounts of alkaline earth metal aluminates and high-surface-area alkaline earth metal aluminates at 363 K

| | catalyst | catalyst weight | yield of iso-alpha-acids | selectivity to iso-alpha-acids |
|---|---|---|---|---|
| entry 1 | $MgAl_2O_4$ | 0.04 g | 70.6% | >95.0% |
| entry 2 | $HSA-MgAl_2O_4$ | 0.04 g | 94.1% | >95.0% |
| entry 3 | $BaAl_2O_4$ | 0.04 g | 52.7% | >95.0% |
| entry 4 | $HSA-BaAl_2O_4$ | 0.04 g | 87.4% | >95.0% |
| entry 5 | / | / | 13.4% | >95.0% |

Reaction conditions: 1 mL ethanol; mass reactant:catalyst ratio = 1; 0.04 g reactant; 363 K; 18 h.

This comparison of alkaline earth metal aluminates shows that high-surface-area magnesium aluminate is the most active catalyst (among magnesium aluminate, high-surface-area magnesium aluminate, barium aluminate and high-surface-area barium aluminate) on mass basis for the isomerisation in ethanol of alpha-acids to iso-alpha-acids at 363 K.

Example 12

Isomerisation of Alpha-Acids in Water with Constant Molar Amounts of Magnesium Based Catalysts at 363 K The same magnesium based catalysts as described in Example 1 were used. The starting composition of the alpha-acid reactant was: 94.1% alpha-acids and 5.9% iso-alpha-acids. 0.4 g of alpha-acid extract was added to 1 mL deionized water. After addition of varying amounts of the powder catalysts, the reaction mixture was stirred and heated to 363 K for 18 h. All reaction vessels were flushed and pressurized with 0.5 MPa nitrogen gas. The powder catalysts were separated from the reaction mixture by centrifugation. For the sample analyses, the same HPLC procedure was applied as described in Example 1, except for the sample preparation. The samples were analyzed after 10-fold dilution in ethanol.

TABLE 12

Isomerisation of alpha-acids in water with constant molar amounts of magnesium based catalysts at 363 K

| | catalyst | catalyst weight | yield of iso-alpha-acids | selectivity to iso-alpha-acids |
|---|---|---|---|---|
| entry 1 | $MgAl_2O_4$ | 0.0157 g | 17.3% | >95.0% |
| entry 2 | $MgTiO_3$ | 0.0132 g | 15.0% | >95.0% |
| entry 3 | $MgSiO_3$ | 0.0108 g | 13.7% | >95.0% |

TABLE 12-continued

Isomerisation of alpha-acids in water with constant molar amounts of magnesium based catalysts at 363 K

| catalyst | catalyst weight | yield of iso-alpha-acids | selectivity to iso-alpha-acids |
|---|---|---|---|
| entry 4 | $Mg_5(PO_4)_3(OH)$ | 0.0093 g | 12.2% | >95.0% |
| entry 5 | / | / | 10.7% | >95.0% |

Reaction conditions: 1 mL water; molar reactant:magnesium ratio = 10; 0.4 g reactant; 363 K; 18 h.

At a reaction temperature of 363 K, 0.4 g of alpha-acids in 1 mL water was converted with 0.0157 g of magnesium aluminate (molar reactant:magnesium ratio=10) to iso-alpha-acids with an iso-alpha-acid yield of 17.3% after 18 h, with a product selectivity to iso-alpha-acids of >95.0% (Table 12, entry 1). In the control experiment without addition of a catalyst, an iso-alpha-acid yield of 10.7% was obtained under the same reaction conditions (Table 12, entry 5). Results with other magnesium based catalysts are given in Table 12. For all reactions of this Example, the product selectivity to iso-alpha-acids was >95.0%.

This comparison of magnesium based catalysts shows that magnesium aluminate is the most active catalyst (among magnesium aluminate, magnesium titanate, magnesium silicate and magnesium hydroxyapatite) on molar basis for the isomerisation in water of alpha-acids to iso-alpha-acids at 363 K.

Example 13

Isomerisation of Alpha-Acids in Water with Constant Molar Amounts of Alkaline Earth Metal Aluminates at 363 K The same alkaline earth metal aluminates as described in Example 2 were used. Also the same procedure for the isomerisation experiments and sample analyses was applied as described in Example 12.

TABLE 13

Isomerisation of alpha-acids in water with constant molar amounts of alkaline earth metal aluminates at 363 K

| catalyst | catalyst weight | yield of iso-alpha-acids | selectivity to iso-alpha-acids |
|---|---|---|---|
| entry 1 | $MgAl_2O_4$ | 0.0157 g | 17.3% | >95.0% |
| entry 2 | $CaAl_2O_4$ | 0.0175 g | 21.7% | >95.0% |
| entry 3 | $SrAl_2O_4$ | 0.0228 g | 26.8% | >95.0% |
| entry 4 | $BaAl_2O_4$ | 0.0279 g | 46.4% | >95.0% |
| entry 5 | / | / | 10.7% | >95.0% |

Reaction conditions: 1 mL water; molar reactant:alkaline earth ratio = 10; 0.4 g reactant; 363 K; 18 h.

At a reaction temperature of 363 K, 0.4 g of alpha-acids in 1 mL water was converted with 0.0157 g of magnesium aluminate (molar reactant:magnesium ratio=10) to iso-alpha-acids with an iso-alpha-acid yield of 17.3% after 18 h, with a product selectivity to iso-alpha-acids of >95.0% (Table 13, entry 1). In the control experiment without addition of a catalyst, an iso-alpha-acid yield of 10.7% was obtained under the same reaction conditions (Table 13, entry 5). Results with other alkaline earth catalysts are given in Table 13. For all reactions of this Example, the product selectivity to iso-alpha-acids was >95.0%.

This comparison of alkaline earth metal aluminates shows that barium aluminate is the most active catalyst (among magnesium aluminate, calcium aluminate, strontium aluminate and barium aluminate) on molar basis for the isomerisation in water of alpha-acids to iso-alpha-acids at 363 K.

Example 14

Isomerisation of Alpha-Acids in Water with Constant Molar Amounts of Alkaline Earth Metal Aluminates of Varying Surface Area at 363 K The same alkaline earth metal aluminates and high-surface-area alkaline earth aluminates as described in Example 4 were used. Also the same procedure for the isomerisation experiments and sample analyses was applied as described in Example 12.

At a reaction temperature of 363 K, 0.4 g of alpha-acids in 1 mL water was converted with 0.0157 g of magnesium aluminate (molar reactant:magnesium ratio=10) to iso-alpha-acids with an iso-alpha-acid yield of 17.3% after 18 h, with a product selectivity to iso-alpha-acids of >95.0% (Table 14, entry 1). In the control experiment without addition of a catalyst, an iso-alpha-acid yield of 10.7% was obtained under the same reaction conditions (Table 14, entry 5). Results with other catalysts, including HSA catalysts (high-surface-area materials), are given in Table 14. For all reactions of this Example, the product selectivity to iso-alpha-acids was >95.0%.

TABLE 14

Isomerisation of alpha-acids in water with constant molar amounts of alkaline earth metal aluminates and high-surface-area alkaline earth metal aluminates at 363 K

| catalyst | catalyst weight | yield of iso-alpha-acids | selectivity to iso-alpha-acids |
|---|---|---|---|
| entry 1 | $MgAl_2O_4$ | 0.0157 g | 17.3% | >95.0% |
| entry 2 | $HSA-MgAl_2O_4$ | 0.0157 g | 39.9% | >95.0% |
| entry 3 | $BaAl_2O_4$ | 0.0279 g | 46.4% | >95.0% |
| entry 4 | $HSA-BaAl_2O_4$ | 0.0279 g | 83.9% | >95.0% |
| entry 5 | / | / | 10.7% | >95.0% |

Reaction conditions: 1 mL water; molar reactant:alkaline earth metal ratio = 10; 0.4 g reactant; 363 K; 18 h.

This comparison of alkaline earth metal aluminates shows that high-surface-area barium aluminate is the most active catalyst (among magnesium aluminate, high-surface-area magnesium aluminate, barium aluminate and high-surface-area barium aluminate) on molar basis for the isomerisation in water of alpha-acids to iso-alpha-acids at 363 K.

Example 15

Solvent-Free Isomerisation of Alpha-Acids with Constant Molar Amounts at 363 K: Comparison with Prior Art Processes Based on Dissolvable Alkali Metal and Earth Alkaline Metal Compounds The same high-surface-area alkaline earth metal aluminates as described in Example 4 were used. Magnesium oxide, magnesium sulfate, potassium hydroxide and potassium carbonate were obtained from a commercial supplier. The isomerisation experiments and sample analyses were performed as described in Example 1.

TABLE 15

Solvent-free isomerisation of alpha-acids with constant molar amounts at 363 K: comparison with prior art processes based on dissolvable alkali metal and earth alkaline metal compounds

| | catalyst | catalyst weight | yield of iso-alpha-acids | selectivity to iso-alpha-acids |
|---|---|---|---|---|
| entry 1 | HSA-MgAl$_2$O$_4$ | 0.0157 g | 45.7% | >95.0% |
| entry 2 | HSA-BaAl$_2$O$_4$ | 0.0279 g | 93.7% | >95.0% |
| entry 3 | MgO | 0.0044 g | 42.7% | 66.2% |
| entry 4 | MgSO$_4$ | 0.0132 g | 13.2% | 91.8% |
| entry 5 | KOH | 0.0062 g | 24.1% | 79.3% |
| entry 6 | K$_2$CO$_3$ | 0.0075 g | 33.6% | 94.1% |
| entry 7 | / | / | 11.8% | >95.0% |

Reaction conditions: molar reactant-alkaline earth metal ratio = 10 or molar reactant-alkali metal ratio = 10; 0.4 g reactant; 363 K; 18 h.

At a reaction temperature of 363 K, 0.4 g of alpha-acids was converted with 0.0157 g of high-surface-area magnesium aluminate (molar reactant:magnesium ratio=10) to iso-alpha-acids with an iso-alpha-acid yield of 45.7% after 18 h, with a product selectivity to iso-alpha-acids of >95.0% (Table 15, entry 1). Under the same reaction conditions, 0.0279 g of high-surface-area barium aluminate (molar reactant:barium ratio=10) resulted in an iso-alpha-acid yield of 93.7%, with a product selectivity to iso-alpha-acids of >95.0% (Table 15, entry 2); 0.0044 g of magnesium oxide (molar reactant:magnesium ratio=10) resulted in an alpha-acid conversion of 42.7%, with a product selectivity to iso-alpha-acids of <70.0% (Table 15, entry 3); 0.0132 g of magnesium sulfate (molar reactant:magnesium ratio=10) resulted in an alpha-acid conversion of 13.2%, with a product selectivity to iso-alpha-acids of <95.0 (Table 15, entry 4); 0.0062 g of potassium hydroxide (molar reactant:potassium ratio=10) resulted in an alpha-acid conversion of 24.1%, with a product selectivity to iso-alpha-acids of <80.0% (Table 15, entry 5); 0.0075 g of potassium carbonate (molar reactant:potassium ratio=10) resulted in an alpha-acid conversion of 33.6%, with a product selectivity to iso-alpha-acids of <95.0% (Table 15, entry 6).

This experimental comparison shows that high-surface-area magnesium aluminate and high-surface-area barium aluminate are more active and more selective catalysts compared to the prior art processes based on dissolvable alkali metal and earth alkaline metal compounds on molar basis for the solvent-free isomerisation of alpha-acids to iso-alpha-acids at 363 K.

Example 16

Solvent-Free Isomerisation of Alpha-Acids at 363 K: Comparison with Insoluble Aluminium Oxide The same high-surface-area alkaline earth metal aluminates as described in Example 4 were used. Alpha aluminium oxide was obtained from a commercial supplier. The isomerisation experiments and sample analyses were performed as described in Example 1.

At a reaction temperature of 363 K, 0.4 g of alpha-acids was converted with 0.0157 g of high-surface-area magnesium aluminate (molar reactant:magnesium ratio=10) to iso-alpha-acids with an iso-alpha-acid yield of 45.7% after 18 h, with a product selectivity to iso-alpha-acids of >95.0% (Table 16, entry 1). Under the same reaction conditions and with the same molar reactant:alkaline earth ratio of 10, use of high-surface-area barium aluminate resulted in an iso-alpha-acid yield of 93.7%, with a product selectivity to iso-alpha-acids of >95.0% (Table 16, entry 2). Under the same reaction conditions, 0.0057 g of alpha aluminium oxide (molar reactant:aluminium ratio=10) resulted in an iso-alpha-acid yield of 11.3%, with a product selectivity to iso-alpha-acids of >95.0% (Table 16, entry 3).

TABLE 16

Solvent-free isomerisation of alpha-acids with constant molar amounts at 363 K: comparison with prior art processes based on insoluble aluminium oxide

| | catalyst | catalyst weight | yield of iso-alpha-acids | selectivity to iso-alpha-acids |
|---|---|---|---|---|
| entry 1 | HSA-MgAl$_2$O$_4$ | 0.0157 g | 45.7% | >95.0% |
| entry 2 | HSA-BaAl$_2$O$_4$ | 0.0279 g | 93.7% | >95.0% |
| entry 3 | α-Al$_2$O$_3$ | 0.0057 g | 11.3% | >95.0% |
| entry 4 | / | / | 11.8% | >95.0% |

Reaction conditions: molar reactant-alkaline earth metal ratio = 10 or molar reactant-aluminium ratio = 10; 0.4 g reactant; 363 K; 18 h.

This comparison shows that high-surface-area magnesium aluminate and high-surface-area barium aluminate are more active catalysts compared to the prior art processes based on insoluble alpha aluminium oxide on molar basis for the solvent-free isomerisation of alpha-acids to iso-alpha-acids at 363 K.

Example 17

Catalyst Recycling in the Solvent-Free Isomerisation of Alpha-Acids with Alkaline Earth Metal Aluminates The same alkaline earth metal aluminates and high-surface-are alkaline earth metal aluminates as described in Example 4 were used. The isomerisation experiments and sample analyses were performed as described in Example 1, except for the amount of reactant and powder catalyst which were increased by a factor 10. The powder catalysts were separated from the reaction mixture by centrifugation or filtration.

At a reaction temperature of 363 K, 4.0 g of alpha-acids was converted with 0.157 g of magnesium aluminate (molar reactant:magnesium ratio=10) to iso-alpha-acids with an iso-alpha-acid yield of 19.6% after 18 h, with a product selectivity to iso-alpha-acids of >95.0 (Table 17, entry 1). In the control experiment without addition of a catalyst, an iso-alpha-acid yield of 11.8% was obtained under the same reaction conditions (Table 17, entry 9). Under the same reaction conditions, 0.157 g of the recycled magnesium aluminate (molar reactant:magnesium ratio=10) to iso-alpha-acids with an iso-alpha-acid yield of 19.3% after 18 h, with a product selectivity to iso-alpha-acids of >95.0% (Table 17, entry 2). Reaction data for fresh and recycled alkaline earth catalysts are presented in Table 17.

TABLE 17

Solvent-free isomerisation of alpha-acids with alkaline earth metal aluminates and high-surface-area alkaline earth metal aluminates at 363 K: catalyst recycling

| | catalyst | catalyst weight | yield of iso-alpha-acids | selectivity to iso-alpha-acids |
|---|---|---|---|---|
| entry 1 | MgAl$_2$O$_4$ | 0.157 g | 19.6% | >95.0% |
| entry 2 | recycled MgAl$_2$O$_4$ | 0.157 g | 19.3% | >95.0% |
| entry 3 | HSA-MgAl$_2$O$_4$ | 0.157 g | 45.7% | >95.0% |

TABLE 17-continued

Solvent-free isomerisation of alpha-acids with alkaline earth metal aluminates and high-surface-area alkaline earth metal aluminates at 363 K: catalyst recycling

| | catalyst | catalyst weight | yield of iso-alpha-acids | selectivity to iso-alpha-acids |
|---|---|---|---|---|
| entry 4 | recycled HSA-MgAl$_2$O$_4$ | 0.157 g | 45.1% | >95.0% |
| entry 5 | BaAl$_2$O$_4$ | 0.279 g | 51.3% | >95.0% |
| entry 6 | recycled BaAl$_2$O$_4$ | 0.279 g | 50.8% | >95.0% |
| entry 7 | HSA-BaAl$_2$O$_4$ | 0.279 g | 93.7% | >95.0% |
| entry 8 | recycled HSA-BaAl$_2$O$_4$ | 0.279 g | 92.1% | >95.0% |
| entry 9 | / | / | 11.8% | >95.0% |

Reaction conditions: molar reactant:alkaline earth metal ratio = 10; 4.0 g reactant; 363 K; 18 h.

Example 18

Isomerisation of Alpha-Acids with Alkaline Earth Metal Based Catalysts: Elemental Analysis on Reaction Products The element analyses of the reaction samples were performed by means of an ICP-AES device. The spectral lines used for alkaline earth metal detection were 279.553 nm for Mg, 422.673 nm for Ca, 421.552 nm for Sr and 455.403 nm for Ba. Prior to elemental analysis of the reaction samples, calibration curves were determined to relate the alkaline earth metal concentration to the intensity of the detection signal. The samples from the solvent-free isomerisation experiments, the isomerisation experiments in ethanol and the isomerisation experiments in water were all analyzed after 100-fold dilution in water.

Under the conditions of the isomerisation reactions in solvent-free conditions, in ethanol medium and in water medium, essentially no leaching of magnesium, calcium, strontium or barium cations into the reaction medium was detected by ICP-AES from the corresponding alkaline earth metal aluminates, high-surface-area alkaline earth metal aluminates, alkaline earth metal titanates, alkaline earth metal silicates and alkaline earth metal hydroxyapatites. In all cases, there was less than 0.01% of alkaline earth metal dissolved from the earth alkaline metal based catalyst into the product phase in the course of the isomerisation experiments. Generally, the product phase contained less than 0.01% of dissolved cations of the respective alkaline earth metal element, with respect to the amount of alkaline earth metal present in the heterogeneous catalyst used in the isomerisation reaction, after separation of the heterogeneous catalyst from the reaction mixture. This demonstrates the heterogeneity of these powder catalysts during the isomerisation reactions.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A method for the isomerisation of hop alpha-acids comprising contacting a hop alpha-acid containing feed with an alkaline earth metal based mixed oxide or hydroxyapatite, acting as a heterogeneous catalyst, which essentially does not dissolve in the alpha-acid containing feed or in the iso-alpha-acid product phase.

2. The method according to claim 1 wherein said alkaline earth metal based heterogeneous catalyst is of the aluminate type, titanate type, silicate type and/or hydroxyapatite type, said alkaline earth metal based heterogenous catalyst further comprising: magnesium, calcium, strontium, barium or mixtures thereof.

3. The method according to claim 1, wherein said alkaline earth metal based heterogeneous catalyst is in its anhydrous form or its hydrated form.

4. The method according to claim 1, wherein the isomerisation reaction occurs in solvent-free conditions.

5. The method according to claim 1, wherein the isomerisation reaction occurs in water, carbon dioxide or an organic solvent or mixtures thereof.

6. The method according to claim 1 wherein the isomerisation reaction occurs at a temperature between 293 and 383 K.

7. The method according to claim 1 wherein the isomerisation reaction occurs under an inert atmosphere.

8. The method according to claim 1 further comprising the step of separating the heterogeneous catalyst from the obtained iso-alpha-acid product after the isomerisation reaction.

9. The method according to claim 8 whereby the separation is performed by centrifugation, filtration, decantation or other liquid-solid separation techniques.

10. The method according to claim 1 wherein the molar ratio of the alpha-acid to the alkaline earth metal is between 0.1 and 40.

11. The method according to claim 1, wherein said alkaline earth metal based heterogeneous catalyst has a surface area of at least 10 m$^2$/g.

* * * * *